July 11, 1967      J. S. BARRY      3,330,225
COVER FOR FREIGHT VEHICLE
Filed March 23, 1964      3 Sheets-Sheet 1
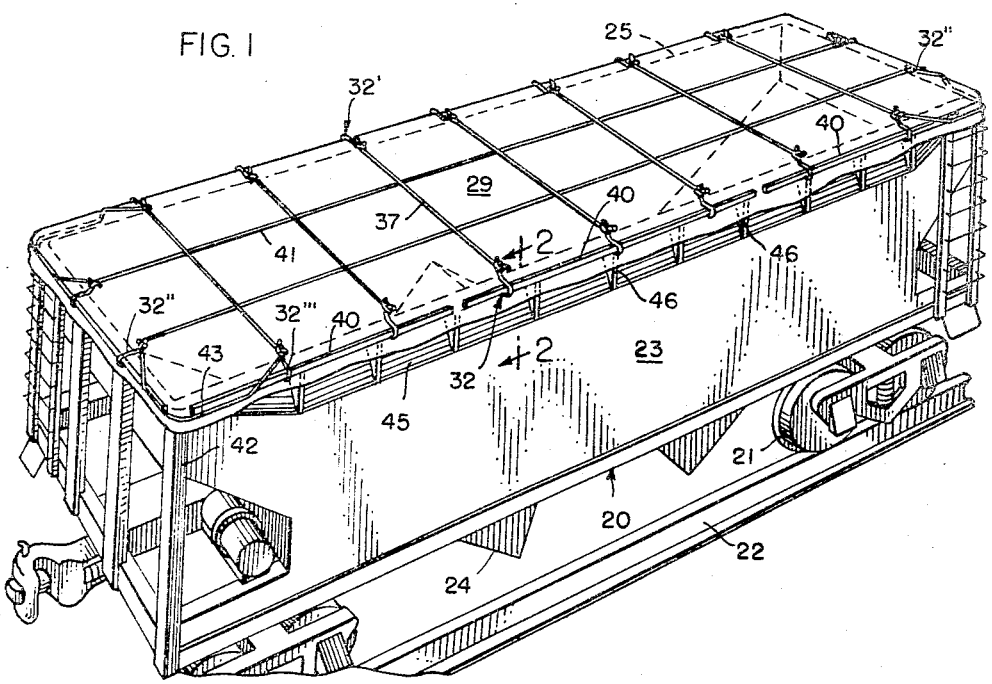
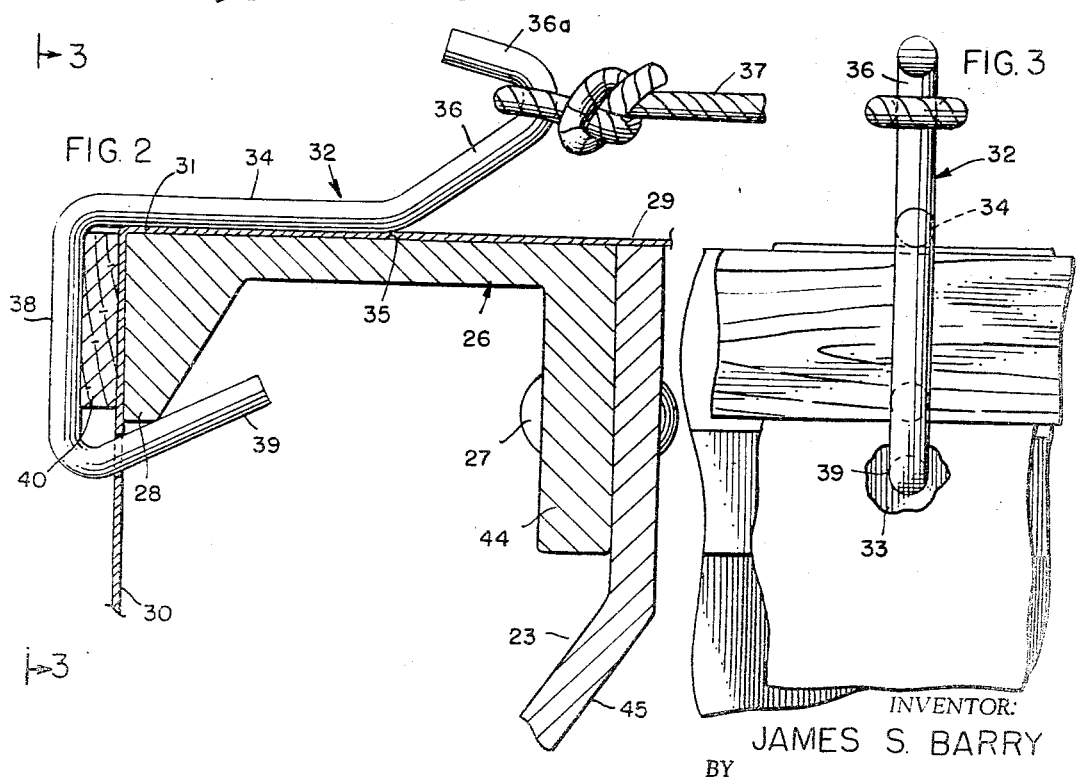
INVENTOR:
JAMES S. BARRY
BY
Dawson, Tilton, Fallon, Lungmus & Alexander
ATT'YS July 11, 1967
J. S. BARRY
3,330,225
COVER FOR FREIGHT VEHICLE
Filed March 23, 1964
3 Sheets-Sheet 2
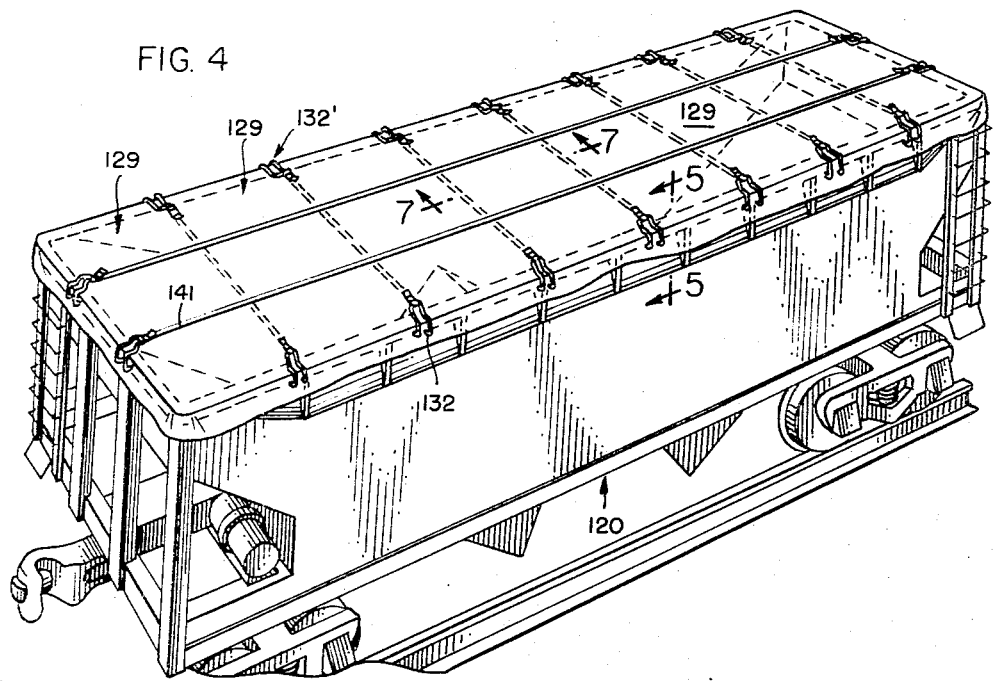
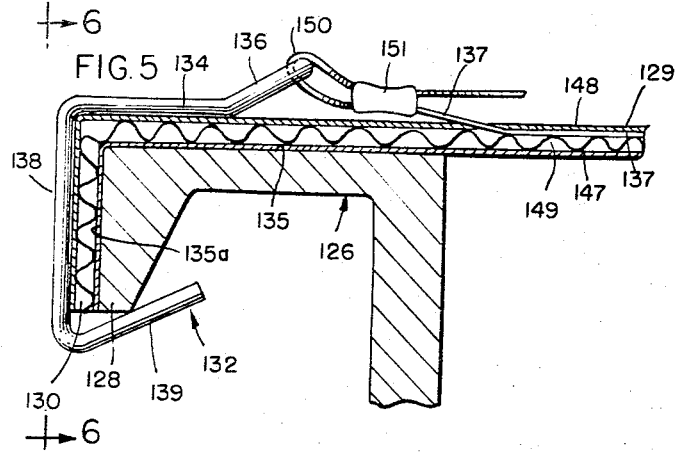 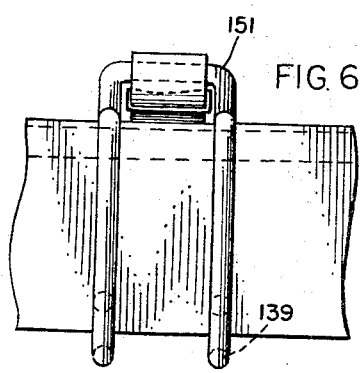
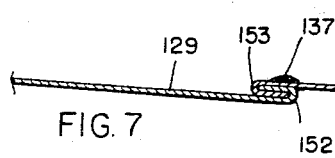
INVENTOR:
JAMES S. BARRY
BY
Dawson, Tilton, Fallon, Lungmus & Alexander
ATT'YS July 11, 1967    J. S. BARRY    3,330,225
COVER FOR FREIGHT VEHICLE
Filed March 23, 1964    3 Sheets-Sheet 3
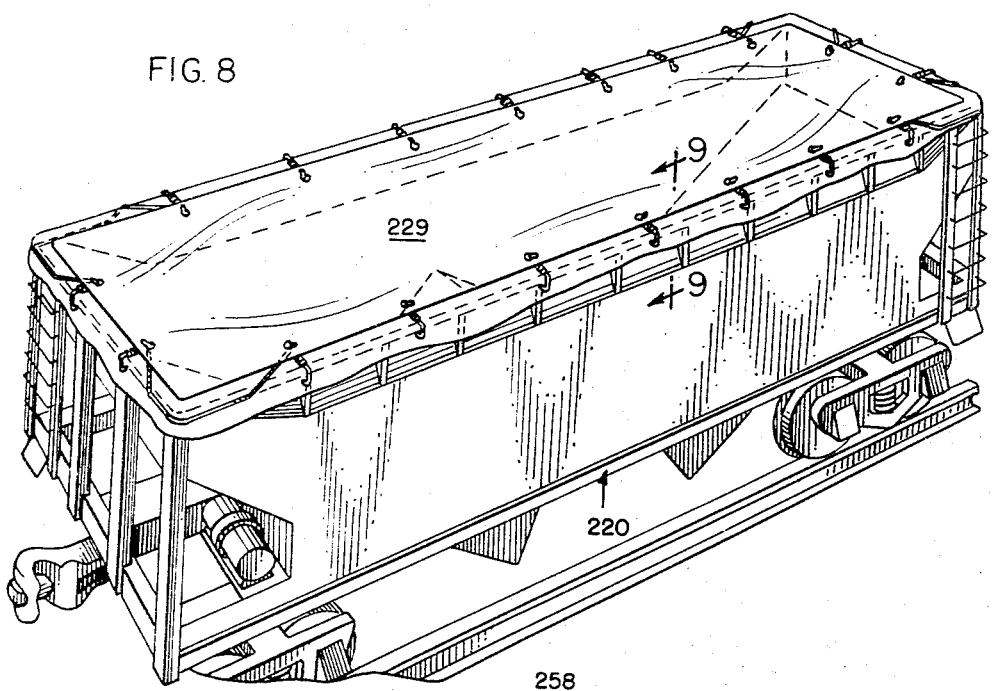
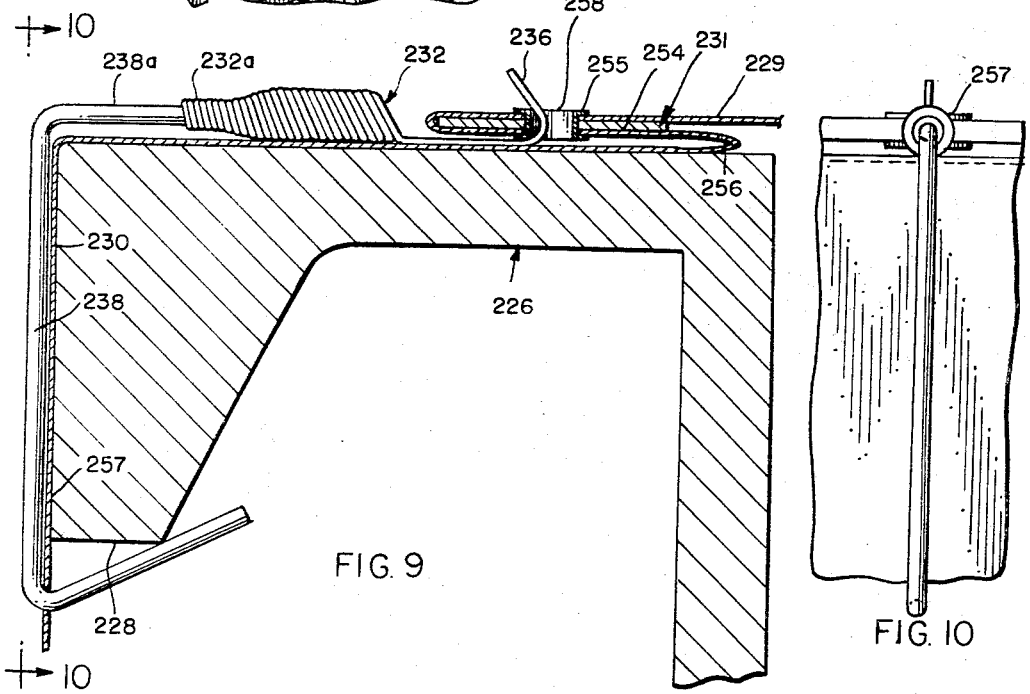
INVENTOR:
JAMES S. BARRY
BY
Dawson, Tilton, Fallon, Lungmus & Alexander
ATT'YS __United States Patent Office__

3,330,225
Patented July 11, 1967

1

3,330,225
COVER FOR FREIGHT VEHICLE
James S. Barry, Omaha, Nebr., assignor of one-half to International Paper Company, New York, N.Y., a corporation of New York, and one-half to The Stanley Works, New Britain, Conn., a corporation of Connecticut
Filed Mar. 23, 1964, Ser. No. 353,679
4 Claims. (Cl. 105—377)

This invention relates to a cover for a freight vehicle and, more particularly, to a cover for a hopper-type railroad car.

The instant invention finds utility in connection with covering hopper cars which are generally rectangular open-topped rail vehicles equipped with bottom dump gates. These cars are used for carrying granular material, among other things, and certain of the materials are subject to spoilage or degradation in general if exposed to the weather.

In recent years, it has become desirable to ship grain by such cars, particularly during the summer, when the usually-employed boxcars are in great demand. To serve this purpose, the hoppers must be covered, and the previous expedients have proven unsatisfactory.

The unsatisfactory operation of the previously employed hopper covers has stemmed from a failure to solve a basic dilemma. One horn of the dilemma involves a securely-mounted, strong cover to withstand the rigors of the weather—particularly billowing occasioned by wind getting underneath the cover. The other horn of the dilemma involves the need for a readily installed and removable, very inexpensive, cover, since there is no assurance that the car will be utilized on the next trip for the same purpose. In fact, this is unlikely, since the car ends up in a grain center such as Chicago, St. Paul, etc., and is then used in hauling scrap, fertilizer, etc. to another point.

It is, therefore, a principal object of the invention to solve this basic and heretofore-unsolved dilemma. More especially, it is an object of the invention to provide a novel cover installation on a hopper car that is characterized by ready installation, ready removal, secure installation, and which is inexpensive to the point of being completely disposable after a single use.

A further object of the invention is to provide a cover installation for an open-topped freight vehicle wherein a flexible cover closes the open top and is uniquely secured by clip-type, reinforced clamping means anchored under a perimetric flange provided about the open top.

Other objects and advantages of the invention may be seen in the details of construction and operation set down in this specification.

The invention is explained in conjunction with the accompanying drawing, in which—

FIG. 1 is a fragmentary perspective view of a railway hopper car equipped with the inventive closure in a first embodiment thereof;

FIG. 2 is an enlarged fragmentary sectional view taken along the sight line 2—2 of FIG. 1;

FIG. 3 is a fragmentary elevational view taken along the sight line 3—3 as applied to FIG. 2;

FIG. 4 is a fragmentary perspective view of a railway hopper car equipped with a modified form of cover installation;

FIG. 5 is an enlarged fragmentary sectional view taken along the sight line 5—5 applied to FIG. 4;

FIG. 6 is an elevational view, in fragmentary form, as seen along the sight line 6—6 applied to FIG. 5;

FIG. 7 is an enlarged fragmentary sectional view taken along the line 7—7 of FIG. 4;

2

FIG. 8 is a fragmentary perspective view of a freight vehicle equipped with yet another form of closure installation;

FIG. 9 is an enlarged fragmentary sectional view taken along the line 9—9 of FIG. 8; and FIG. 10 is a fragmentary elevational view taken along the line 10—10 as applied to FIG. 9.

Referring now to the drawing, and in particular FIG. 1, the numeral 20 designates generally a freight vehicle which is seen to be a hopper car equipped with wheels 21 for traveling on rails 22. The hopper car is defined by upstanding side walls, one longitudinal side wall being designated 23. The car is equipped with the usual bottom dump gates as at 24 and is seen to have an open top as at 25. The open top 25 is defined by a perimetric flange generally designated 26 (see FIG. 2) which is secured by means of rivets 27 to the various side walls such as that designated 23 in FIG. 2.

The flanges 26 conventionally employed have depending skirt portions as at 28 which are conventionally referred to as "bulb angles."

Providing the inventive cover installation is an elongated, generally rectangular sheet designated 29 which is seen to overlap the skirt 28 as at 30 in FIG. 2. The skirt or cover 29 is flexible so as to accommodate folding around the bulb angle as at 31 and is maintained in place by a plurality of generally C-shaped clips designated 32. The clips 32 extend through punctures or holes in adjacent portions of the depending sheet 30 as at 33 in FIG. 3, and bear against the lower extremity of the bulb angle skirt 28. The clip 32 in greater detail includes an intermediate portion 34 adapted to bear against the flat top 35 of the flange 26. Provided as an integral, inwardly and upwardly angled extension of the intermediate portion 34 is a hook-shaped portion 36 to which is attached one end of a cross tie 37. The other end of the cross tie 37 (by reference to FIG. 1) is seen to be attached to an aligned, oppositely disposed clip 32'.

The end of the clip 32 opposite that equipped with the portion 36 is formed into a "C" and includes a depending portion 38 and an upwardly-angled portion 39, the latter being the portion engaging the bulb angle skirt 28.

Positioned between the depending portion 30 of the cover 29 and the depending portion 38 of the clip 32 is a lath 40 which, as is seen in FIG. 1, extends over a substantial portion of the length of the car 20. Through the use of the reinforcing means developed in the wooden lath 40, clips 32 can be provided at the spaced-apart points seen without the cover portion 29 gaping, which would otherwise give rise to the possibility of undesirable billowing.

Still referring to FIG. 1, it will be seen that cross ties 41 are provided extending generally longitudinally of the car 20, which are coupled to end clips 32", with the cross tie extending around the corner 42 and under the flange 26 to secure the folded corner of the sheet as at 43. The ends of the longitudinally-extending tie ropes 41 are secured to the adjacent clips as at 32'''.

A specific embodiment of the cover installation seen in FIGS. 1–3 includes a cover of waterproofed, laminated reinforced paper product—of a size long enough and wide enough to completely encase the top of the car. Hopper cars range in length between 39 feet and 41'6", having a width of the order of 10'4". The bulb angles, or, more properly, the flanges 26, are of the order of 5" wide, i.e., the horizontal dimension seen in FIG. 2, with the skirt 28 depending 1½" below the top surface 35. The inner depending flange 44 extends downwardly about 4", terminating slightly above the angled portion of the sides as at 45 (see FIGS. 1 and 2). It will also be noted that the upper portions of the walls 23 are reinforced directly under the flange 26 by fish-plates or ribs as at 46.

The cover 29, in addition to having an asphalt central layer, also includes a jute scrim between the outer liner sheets and weighs 43–45 pounds per 1,000 square feet. The extensible type paper thus is able to withstand shocks due to the shifting granular load, and by virtue of the laminant and waterproof coating is substantially moisture-resistant.

The cover 29 is secured against billowing through the use of the wood laths 40, which are ¼" thick plywood having a width of 1½". The strips may also take the form of common wood, metal, solid fibre, etc.

At spaced-apart points, of the order of 18–36", the C-shaped hook clips 32 are installed as seen in FIG. 2, being constructed of ¼" O.D. steel rod, with the depending portion 38 measuring about 1¾" in length, the other portions 34, 36 and 39 corresponding to the showing in FIG. 2, which is generally to scale.

In the installation as seen in FIGS. 1–3, the cross ties 37, which may be constructed of suitable strength rope or line, the C-shaped clips 32 urge the wood laths 40 against the depending portions 30 of the cover 29, and are immobilized by the coaction of the cross ties 37 and the engagement with the depending skirt 28.

The installation is straightforward, the cover 29 being provided in roll form so as to facilitate easy unrolling along the length of the car, after which the laths 40 are held against the sides while a pair of clips are forced into the position shown in FIG. 2, the spacing between the portions 34 and 39 of the clips 32 being slightly less than the depth of the bulb angle skirt 28—thereby resulting in a slight expansion 39 relative to the remainder of the C-shaped clip 32. This effectively clamps the clip 32 in place, and the upwardly-angled portion 39 effectively urges the reinforcing strip 40 against the flange 26. This is augmented by the fastening of the cross tie 37 between oppositely-disposed clips as at 32 and 32' in FIG. 1.

A second form of cover installation for an open-topped, generally rectangular freight vehicle can be seen in FIGS. 4–7, wherein the numeral 120 designates generally the hopper-type railway car, which is covered by a series of panels each designated 129.

As can be appreciated from a consideration of FIG. 5, each panel 129 includes corrugated paperboard made up of a bottom liner 147, a top liner 148, an included corrugated core 149, and metal straps 137. The metal straps 137 are seen to be initially embedded within the panel by virtue of being confined between the upper liner 148 and the corrugated core 149 (see also FIG. 7). The straps, at opposite ends, are folded on themselves as at 150, and the overlapping ends are clipped together as at 151 by a strap clamp. The loop formed by folding the strap as at 150 engages a cross or connective portion 151 provided on the double pronged, C-shaped hook generally designated 132. It will be seen that the clips 132 are essentially similar to the clips 32 except for the omission of the extreme upper portion 36a, this being provided by the connective portion 151 connecting the two prongs of the clip 132, as can be best seen in FIG. 6. Again, the upwardly angled end portions 139 of the clips 132 engage the bulb angle skirt 128 (see FIG. 5). Rigidification for the cover 129 is provided in the depending portion thereof as at 130, which includes the corrugated core 149. Here, it will be seen that the flutes of the corrugated core 149 extend generally longitudinally of the car and transversely of the length of the straps 137.

Completing the installation are longitudinally-extending straps 141 which are above the panels 129. Each panel 129 (see FIG. 7) is provided with a creased portion at the edges thereof as at 152 and 153. The folded or creased portions 152 and 153 are interlocked as shown, with the straps 137 overlying each interlock (still referring to FIG. 7). Thus, the aligned clips 132 and 132' serve to confine the overlapped panels against gaping.

In the specific illustration given, the depending portion 138 of the hooks 132 is again of an actual length of about 1¾" to accommodate a clamping relationship between the top surface 135 of the flange 126 and the bulb angle skirt 128. Because of the use of double prongs on the clips, it is possible to use a slightly smaller steel rod for forming the clips 132, the diameter being of the order of 3/16". The remaining portions of the clip 132, as at 134, 139 and 136, are approximately to scale relative to the portion 138 as shown in FIG. 5.

In the installation of the embodiment of the invention seen in FIGS. 4–7, the installer starts at one end of the hopper car 120, folding the front flap of the first panel over the end of the car and tucking the outer edges of the flaps under the side flaps as in forming a box section. An ordinary installation may utilize eight panels of a sheet size 76" x 136", being made up of 26 lbs. or 33 lbs. liner board waxed on one side and equipped with 0.10" steel strapping.

It will be noted that only the two end panels require two straps each, the remaining panels requiring only one strap 137 in order to be satisfactorily secured under the bulb angle skirt 128.

Continuing the installation, once the side flaps have been disposed as indicated, a clip is attached to the underside of the overhanging bulb angle skirt 128 near the starting end of the car. One end of the strap positioned in the first panel installed is attached to the clip and tensioned in place by means of the strap clamps 151.

The actual extent of the flap form for the interlock between adjacent panels may be of the order of 8".

In the embodiment of the invention seen in FIGS. 4–7, it is possible to eliminate the wood laths 40 provided in the form seen in FIGS. 1–3, inasmuch as the flutes of the corrugated core 149 provide a rigidification action. Thus, along the length of the car, the cover depending portion 130 is effectively clamped in substantially full bearing contact with the faces 135 and 135a of the flange 126 to prevent any inadvertent billowing of the cover panels 129. At the same time, the clips 132 of the cover panels 129 are cheaply and easily provided, so that at the end of a given trip, the entire cover may be discarded, along with the associated securing means.

A third embodiment of the invention is seen in FIGS. 8–10, wherein the numeral 229 designates a cover installed on a hopper car generally designated 220. The cover 229 may be of the same construction as that described relative to the cover 29 seen in FIGS. 1–3. The cover 229, at least along the longitudinal edges thereof, is provided with an S-fold as at 231 to develop the downwardly-extending portion 230 (see especially FIG. 9). To provide this construction, normally the longitudinal edges of the cover material 229 will be folded back to provide a pocket 254 for a rigid insert 255. In the illustration given, the length of the fold between the point 256 and the longitudinal edge 257 is of the order of 18". The pocket 254 receives a 2" wide strip of solid fiber suitably adhesively retained in the pocket 254. Further, eyelets as at 258 are provided at suitable distances along the length of the car for the receipt of a spring clip 232. It will be seen that the hook portion 236 of the clip extends through the eyelet or grommet 258, and that the end of the spring clip 232 remote from the portion 236 is tapered as at 232a. This receives the conically-shaped end 238a of a generally C-shaped clip 238 installed about the bulb angle skirt 228.

As before, the clips 232 serve to stretch and confine the cover 229. Further, the solid fiber stripping provides a rigidification for the cover 229 which is stretched tautly by virtue of the coaction of the elements 258, 232 and 238.

While in the foregoing specification a detailed description of the invention has been set down for the purpose of explanation thereof, many variations in the details herein given may be made by those skilled in the art without departing from the spirit and scope of the invention.

I claim:
1. In combination with a freight vehicle having upstanding side walls providing a generally rectangular open top defined by a perimetric generally planar-topped flange, said flange being equipped with a depending bulb angle skirt in spaced, generally parallel, relation to said side walls, a generally flexible cover closing said open top and extending over said flange top and down said skirt to provide oposite free longitudinal edges, a plurality of C-shaped clips clampingly mounted on said bulb angle skirt, each of said C-shaped clips having an upper portion bearing against the top of said flange and a lower portion angled upwardly and in contact with the bottom of said bulb angle skirt, and a pair of elongated relatively rigid members on opposite longitudinal sides of said vehicle in operative contact with said clips associated with a given side and at a spaced distance from said free longitudinal edge of said cover to stabilize said clips in a generally vertical position.

2. The structure of claim 1 in which said members include wood laths which are positioned along the associated skirt.

3. The structure of claim 1 in which said members include an S-shaped fold in said cover along each longitudinal side, said fold being parallel with the plane of said cover, and an isert within said fold, each clip at its upper end having a hook-like projection extending through a portion of said fold and the insert therein, said clip including a spring portion adjacent said hook portion.

4. The structure of claim 1 in which said cover includes fibrous liner having an asphaltic core with jute scrim embedded therein.

References Cited
UNITED STATES PATENTS

| | | | |
|---|---|---|---|
| 894,759 | 7/1908 | Stevens | 105—377 |
| 1,770,329 | 7/1930 | Van Hulst | 105—377 |
| 2,248,500 | 7/1941 | Hilbish et al. | 105—377 |
| 2,768,004 | 10/1956 | Wagner | 280—179 |
| 2,911,254 | 11/1959 | Schumacher | 296—100 |
| 3,024,063 | 3/1962 | Robinson | 296—100 |
| 3,044,653 | 7/1962 | Tantlinger | 105—377 |

ARTHUR L. LA POINT, *Primary Examiner.*

DRAYTON E. HOFFMAN, *Examiner.*